United States Patent [19]
Smedler et al.

[11] Patent Number: 5,787,706
[45] Date of Patent: Aug. 4, 1998

[54] EXHAUST GAS PURIFICATION DEVICE

[75] Inventors: Gudmund Smedler, Ronnang; Staffan Lundgren, Hindas; Edward Jobson, Romelanda; Bjorn Dexell; Ove Backlund, both of Gothenborg, all of Sweden

[73] Assignee: AB Volvo, Sweden

[21] Appl. No.: 666,558

[22] PCT Filed: Dec. 22, 1994

[86] PCT No.: PCT/SE94/01238

§ 371 Date: Aug. 23, 1996

§ 102(e) Date: Aug. 23, 1996

[87] PCT Pub. No.: WO95/18292

PCT Pub. Date: Jul. 6, 1995

[30] Foreign Application Priority Data

Dec. 30, 1993 [SE] Sweden ................. 9304371

[51] Int. Cl.⁶ .................. F01N 3/20; F01N 3/28
[52] U.S. Cl. .................. 60/288; 60/297; 60/324
[58] Field of Search .................. 60/288, 297, 299, 60/301, 311, 324

[56] References Cited

U.S. PATENT DOCUMENTS

| | | | |
|---|---|---|---|
| 4,686,827 | 8/1987 | Wade et al. | 60/297 |
| 5,052,178 | 10/1991 | Clerc et al. | 60/297 |
| 5,067,319 | 11/1991 | Moser | 60/288 |
| 5,097,665 | 3/1992 | Kammel | 60/297 |
| 5,398,503 | 3/1995 | Danno et al. | 60/297 |
| 5,467,594 | 11/1995 | Aoki et al. | 60/297 |
| 5,589,143 | 12/1996 | Mori et al. | 60/297 |
| 5,709,081 | 1/1998 | Bruestle | 60/288 |

FOREIGN PATENT DOCUMENTS

| | | |
|---|---|---|
| 0424966 | 12/1992 | European Pat. Off. . |
| 468322 | 11/1991 | Sweden . |

*Primary Examiner*—Willis R. Wolfe
*Attorney, Agent, or Firm*—Lerner, David, Littenberg, Krumholz & Mentlik

[57] ABSTRACT

An exhaust gas purification device (10) for trapping combustion engine exhaust emissions, particularly hydrocarbons and particulate matter, is disclosed. The device includes a casing (12) having an inlet (14) for exhaust gases from a combustion engine. The casing (12) houses a filtering and/or adsorbing medium (16), whilst a catalytic converter (22) is arranged downstream of the medium (16). A valve arrangement is provided for controlling exhaust gas flow through the filtering and/or adsorbing medium (16). The casing further includes a throughflow passage (18) adjacent the filtering and/or adsorbing medium (16), the passage running from the upstream end to the downstream end of the filtering and/or adsorbing medium (16). The passage also includes a throttling valve (20) responsive to temperatures in the device.

8 Claims, 2 Drawing Sheets

EXHAUST GAS PURIFICATION DEVICE

TECHNICAL FIELD

The present invention relates to an exhaust gas purification device for trapping combustion engine exhaust emissions, particularly hydrocarbons and particulate matter.

BACKGROUND OF THE INVENTION

For the last two decades, massive efforts have been made to reduce exhaust gas emissions as a result of increased environmental concern on the part of the general public and an increased knowledge concerning the harmful effects caused by the emissions. In terms of the otto-engine, replacement of carburettor systems by fuel injection technology and the first generation of catalytic converters was soon followed by three-way catalyst technology with closed-loop control of the air/fuel ratio. Despite the significant achievements provided by these technological milestones, even greater efforts will have to be made to satisfy more stringent forthcoming emission legislation.

One area in which improvement is needed is in cold-start emissions. The purification of toxic components in exhaust gases by catalysts is very much dependent on the temperature of the exhaust gas and when the exhaust gas temperature is low, for example immediately after cold start-up, hydrocarbons are hardly purified by the catalyst. Technical development for reducing cold start emissions from otto engines has resulted in a few promising approaches, for example the electrically heated catalyst (EHC) and the use of secondary air injection into the exhaust system. Cost and reliability aspects may, however, be limiting factors for the widespread adaption of these concepts. In short, there is still a need for substantial improvement of cold start emissions from otto engines. The same is true for diesel and gas turbine engines.

Diesel engines have, in addition, the drawback of emitting particulates which are generally believed to play an important role as carriers of carcinogenic poly-aromatic hydrocarbons. Particulate emission reduction, therefore, has prime priority for diesel engine designers. Besides recent progress in diesel combustion technology, achieved by more accurate control of cylinder flow and fuel injection, a large number of systems have been developed to reduce the particulate emissions by aftertreatment systems, most commonly through trapping and burning the particulates in the exhaust system. In this case, it is absolutely essential that the burning, or regeneration, of the device that traps the particulates is carefully controlled. Otherwise, the latent heat of the particulates may well cause a virtual fire, yielding complete failure of the system. Therefore, inventions which make control of the regeneration procedure more robust are certainly needed.

Relatively recently, a new trend in cold start emission technology has gained momentum. This trend is based on the use of adsorbents to trap the cold start emissions at low exhaust gas temperature and to desorb them at higher temperature when the downstream catalytic converter has reached its operating (or light-off) temperature. Typical problems encountered for devices that use this principle include: i) difficulties in controlling the adsorption/desorption phases precisely, ii) slower heating of the catalytic converter due to increased upstream thermal inertia, iii) parasitic power losses introduced by the increased flow resistance, and iv) the mechanical complexity of the device itself. The last class of problem is related to the first one, since the control of the desorption process is often achieved by means of complete or partial bypassing of the device, introducing the inherent complexity of valve systems. An absorbent trapper and bypass arrangement is disclosed in EP-A-0 424 966 in which exhaust gases below a first temperature are passed through an absorbent trapper. When the exhaust gas temperature reaches the first temperature, a valve is activated to feed the exhaust gases through a conduit to bypass the trapper. When the exhaust gases reach a second, higher, temperature, the exhaust gases are again diverted through the trapper.

SUMMARY OF THE INVENTION

It is therefore an object of the invention to provide an exhaust gas purification device for trapping exhaust emissions, particularly hydrocarbons and particulate matter, from combustion engines which is simpler and more efficient than known arrangements.

This object is achieved in accordance with the present invention by an exhaust gas purification device for trapping combustion engine exhaust emissions, particularly hydrocarbons and particulate matter, said device comprising:

- a casing having an inlet for exhaust gases from a combustion engine, said casing housing a filtering and/or adsorbing medium, said medium presenting an upstream end and a downstream end;
- a catalytic converter arranged downstream of said filtering and/or adsorbing medium, and
- a valve arrangement responsive to temperatures in said device for controlling flow through said filtering and/or adsorbing medium;

wherein said casing further includes a throughflow passage adjacent said filtering and/or adsorbing medium, said passage running from said upstream end to said downstream end of said filtering and/or adsorbing medium, and said valve arrangement comprises a throttling valve arranged within or at either end of said throughflow passage.

Since, in accordance with the invention, the throughflow passage is provided within the casing, a more compact arrangement is obtained. In addition, the proximity of the passage to the filtering and/or adsorbing medium provides effective heating of the medium.

BRIEF DESCRIPTION OF THE DRAWINGS

The invention will be described in greater detail in the following by way of example only and with reference to the attached drawings, in which.

BEST MODE OF CARRYING OUT THE INVENTION

Figure 1:
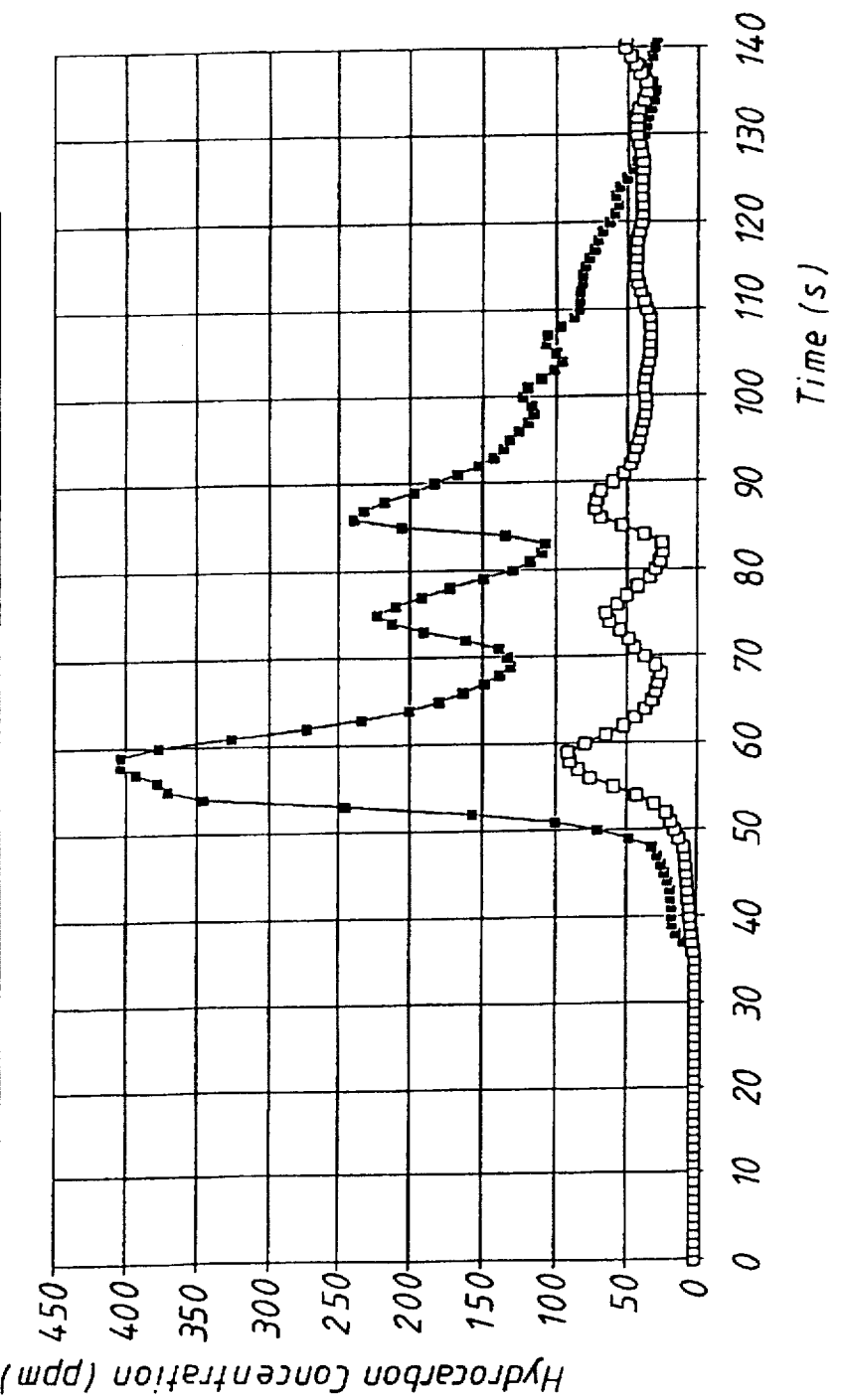
FIG. 1 is a graph depicting a comparison of hydrocarbon concentrations in exhaust gases of an engine fitted with the device according to the invention and an engine without the device according to the invention.

The effectiveness of the device according to the invention which is described in the following is clearly illustrated in FIG. 1. In the shown example, a 2.3 liter Volvo petrol engine provided the cold start emissions. The upper line on the graph depicts the emissions from the engine without the device according to the invention being fitted, whilst the lower line shows the resulting cold start emissions when the device according to the invention is employed.

Figure 2:
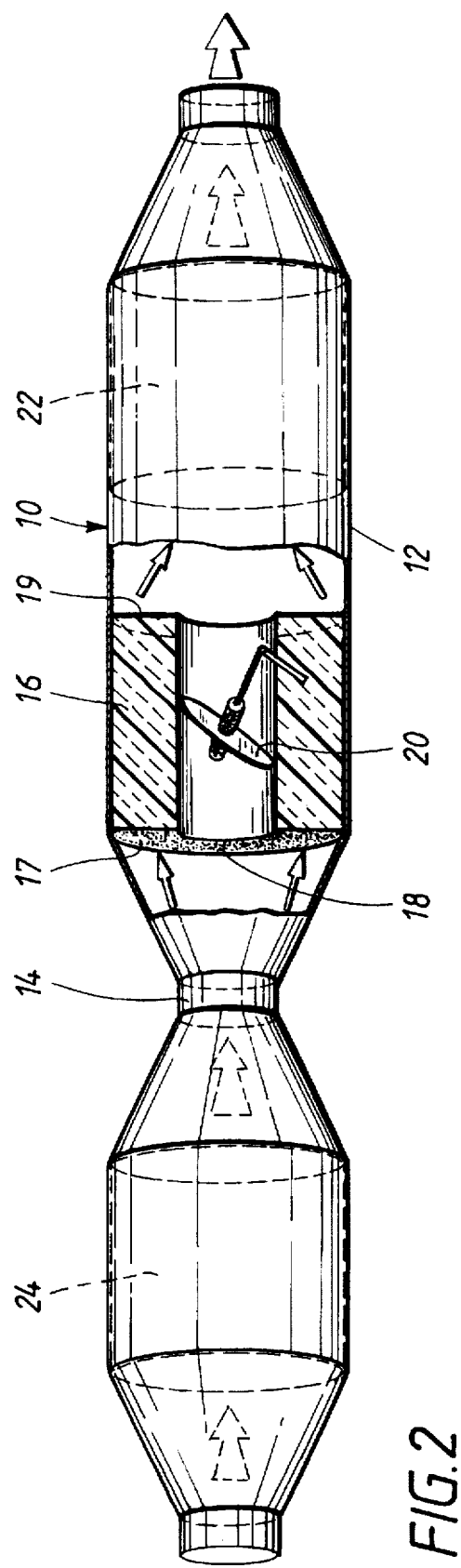
FIG. 2 is a schematic partial sectional view of the device according to the invention in its cold start up mode.
Figure 3:
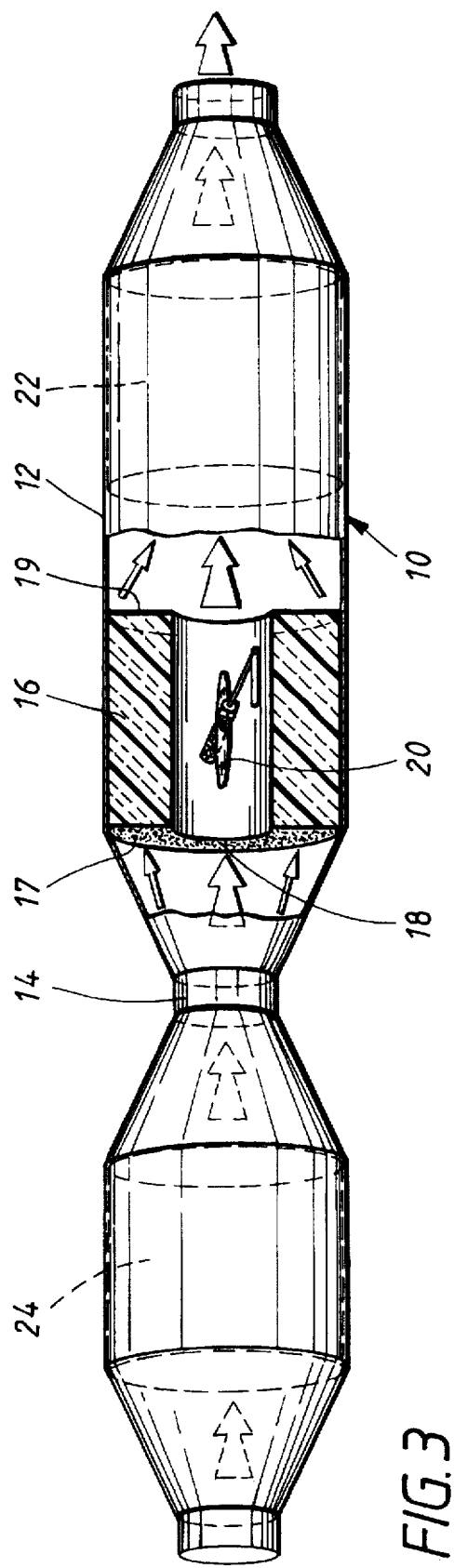
FIG. 3 is a schematic partial sectional view of the device according to the invention in its normal operating mode.

With reference to FIGS. 2 and 3, reference numeral 10 generally denotes the exhaust gas purification device according to the invention. The device comprises a casing 12 having an inlet 14 for exhaust gases from a combustion engine (not shown). The casing 12 houses a filtering and/or adsorbing medium 16, with the medium presenting an upstream end 17 and a downstream end 19. The medium may consist of a packed bed of pelleted or granular material, a straight channel monolith, a ceramic foam or a honeycomb filter. The medium is provided with suitable agents to promote the filtering process. Such agents include zeolite, for example modernite, ceramic material such as cordierite, active carbon, mullite or silicon carbide. The casing 12 further includes a throughflow passage 18 which, in accordance with the present invention, is positioned adjacent the filtering and/or adsorbing medium 16 and runs from the upstream end 17 to the downstream end 19 of the medium 16. The passage 18 cooperates with a throttling valve 20 responsive to temperatures in the device 10. The throttling valve 20 may be activated in a number of ways, for example using a solenoid actuator, a bimetallic (temperature-responding) device, a stepper motor or the likes. The throttling valve 20 may either be positioned within the passage 18 as illustrated in FIGS. 2 and 3, or may be arranged at either end of the passage, preferably the downstream end, to thereby close off the passage when the valve 20 is in a closed position.

The device 10 also comprises a catalytic converter 22 arranged downstream of the filtering and/or adsorbing medium 16. As shown in the drawings, the catalytic converter 22 is advantageously housed within the casing 12. Preferably, the throttling valve 20 is responsive to the temperature of the downstream catalytic converter.

In a preferred embodiment of the invention, and as illustrated in the drawings, the casing 12 comprises an outer and an inner coaxial tube, with the inner coaxial tube forming the throughflow passage 18. The outer coaxial tube may be advantageously formed by the casing itself. Accordingly, an annular space is created between the inner tube (i.e. the throughflow passage 18) and the outer tube (i.e. the casing 12). This annular space is filled with the filtering and/or adsorbing medium 16.

As has been mentioned previously, at low exhaust gas temperatures hydrocarbons are hardly purified by the catalytic converter. In order to accelerate the warming up of the downstream catalytic converter 22, in a preferred embodiment of the present invention a catalytic converter 24 is provided upstream of the filtering and/or adsorbing medium 16. For reasons which will become apparent from the following description of the mode of operation of the device according to the invention, the upstream catalytic converter 24 is preferably smaller than the downstream converter 22.

The device according to the invention operates in the following manner.

After cold start up, the exhaust gas flow which contains relatively high concentrations of harmful substances passes through the upstream catalytic converter 24. Thus, the upstream catalytic converter 24 is heated up whilst the exhaust gas flow is cooled. The exiting exhaust gas flow enters the casing 12. Since the downstream catalytic converter 22 is still cold, the throttling valve 20 in the through passage 18 is in its closed position as shown in FIG. 2. Thus, substantially the entire exhaust gas flow is directed through the filtering and/or adsorbing medium 16. The medium 16 effectively adsorbs the emission components in the cold exhaust flow. Thereafter, the cleansed exhaust gas flow passes through the cold downstream catalytic converter 22 and exits to atmosphere.

Due to its relatively small size, the upstream catalytic converter 24 quickly reaches its operative (light-off) temperature which is typically between 180° and 250° C. The temperature of the exiting exhaust gas flow thus rises rapidly and the downstream catalytic converter 22 begins to warm up. The increase in temperature of the downstream catalytic converter 22 causes the throttling valve 20 to open and, as a result of the much lower flow resistance through the throughflow passage 18 compared to the corresponding flow resistance through the adsorbing medium, the majority of the hot exhaust gas flow passes directly to the downstream catalytic converter 22, which is thereby exposed to a hot flow of stoichiometric composition, i.e. to its ideal operating conditions. Meanwhile, the lesser volume of the exhaust gas flow, for example, 5 to 10%, passes through the annular space, thereby desorbing the emission components from the adsorber at a very slow rate. The emission components are thereafter mixed with the very much larger flow which comes directly from the upstream catalytic converter 24. This flow path is illustrated in FIG. 3.

Naturally, the present invention is not restricted to the embodiments described above and illustrated in the drawings but may instead be varied within the scope of the appended claims. For example, the casing 12 may be centrally divided so that the filtering and/or adsorbing medium 16 occupies one half of the cross section of the casing whilst the other half serves as the throughflow passage 18. Whilst the invention has been described in connection with a petrol engine, it is to be understood that it may also be advantageously employed on diesel and gas turbine engines. Due to the greater exhaust gas output of gas turbine engines, it will be apparent to the skilled person that the device according to the invention needs to be dimensioned accordingly.

We claim:

1. An exhaust gas purification device for trapping combustion engine exhaust emissions, said device comprising a casing having an inlet for exhaust gases from a combustion engine, said casing further comprising an outer coaxial tube and an inner coaxial tube defining an annular space therebetween, said annular space being filled with a filtering medium having an upstream end and a downstream end and said inner coaxial tube forming a throughflow passage running from said upstream end to said downstream end of said filtering medium, a downstream catalytic converter arranged downstream of said filtering medium, and a valve arrangement comprising a throttling valve associated with said throughflow passage, said throttling valve responsive to temperatures in said device for controlling the flow through said filtering medium.

2. The exhaust gas purification device as claimed in claim 1, wherein said throttling valve is responsive to the temperature of said downstream catalytic converter.

3. The exhaust gas purification device as claimed in claim 1, wherein when the temperature of said downstream catalytic converter is below a predetermined value, said throttling valve is closed so that the exhaust gas flow passes through said filtering medium.

4. The exhaust gas purification device as claimed in claim 1, wherein when the temperature of said downstream catalytic converter is above a predetermined value, said throttling valve is set to allow a majority of the exhaust gas flow to pass through said throughflow passage.

5. The exhaust gas purification device as claimed in claim 1, including an upstream catalytic converter upstream of said filtering medium.

6. The exhaust gas purification device as claimed in claim 5, wherein said upstream catalytic converter is smaller than said downstream catalytic converter.

7. The exhaust gas purification device as claimed in claim 6, wherein said downstream catalytic converter is housed within said casing.

8. The exhaust gas purification device as claimed in any one of claims 5 to 4, wherein the exhaust gas flow passes through both said downstream catalytic converter and said upstream catalytic converter at all times.

* * * * *